(12) United States Patent
Chan (10) Patent No.: US 10,983,325 B2
(45) Date of Patent: Apr. 20, 2021

(54) TRANS-ILLUMINATION IMAGING WITH AN ARRAY OF LIGHT SOURCES

(71) Applicant: Molecular Devices, LLC, Sunnyvale, CA (US)

(72) Inventor: Matthew Chan, Palo Alto, CA (US)

(73) Assignee: MOLECULAR DEVICES, LLC, Sunnyvale, CA (US)

( * ) Notice: Subject to any disclaimer, the term of this patent is extended or adjusted under 35 U.S.C. 154(b) by 0 days.

(21) Appl. No.: 15/375,512

(22) Filed: Dec. 12, 2016

(65) Prior Publication Data

US 2018/0164567 A1    Jun. 14, 2018

(51) Int. Cl.
| | |
|---|---|
| G02B 21/08 | (2006.01) |
| G02B 21/18 | (2006.01) |
| G02B 21/36 | (2006.01) |
| G02B 19/00 | (2006.01) |

(52) U.S. Cl.
CPC ......... *G02B 21/367* (2013.01); *G02B 21/084* (2013.01); *G02B 21/086* (2013.01); *G02B 19/0066* (2013.01)

(58) Field of Classification Search
None
See application file for complete search history.

(56) References Cited

U.S. PATENT DOCUMENTS

| | | | | |
|---|---|---|---|---|
| 2008/0055406 A1* | 3/2008 | Ishii | ..................... | G02B 21/365 348/79 |
| 2009/0059215 A1* | 3/2009 | Mehanian | .............. | G02B 21/18 356/237.2 |
| 2009/0109285 A1* | 4/2009 | Tobiason | ............... | G02B 21/06 348/79 |
| 2011/0109736 A1* | 5/2011 | Mertz | ..................... | G06T 5/008 348/79 |
| 2011/0176127 A1* | 7/2011 | Kanda | ................ | G01N 15/1429 356/72 |
| 2012/0257040 A1 | 10/2012 | Koebler et al. | | |
| 2013/0258076 A1 | 10/2013 | Fujimoto et al. | | |
| 2015/0285785 A1* | 10/2015 | Somekh | ............. | G02B 21/0004 435/29 |

(Continued)

FOREIGN PATENT DOCUMENTS

| | | |
|---|---|---|
| JP | 2012147739 A | 8/2012 |
| JP | 2015118036 A | 6/2015 |
| JP | 2016191646 A | 11/2016 |

OTHER PUBLICATIONS

International Search Report and Written Opinion for PCT/US2017/065346 dated Mar. 28, 2018.

*Primary Examiner* — Frederick D Bailey
(74) *Attorney, Agent, or Firm* — Merchant & Gould P.C.

(57) ABSTRACT

Method and system for trans-illumination imaging. In an exemplary method, a sample is irradiated in a well. The sample may include biological cells and a liquid or semi-solid medium that forms a meniscus. The step of irradiating may be performed with an array of light sources generating light of respective light beams that are incident on the meniscus at different orientations from one another. One or more images may be detected. A proportional contribution of light from two or more subsets of the light sources to the one or more images may be controlled by differential energization of the two or more subsets relative to one another to compensate for refraction by the meniscus and improve contrast.

21 Claims, 8 Drawing Sheets

(56) References Cited

U.S. PATENT DOCUMENTS

| | | | |
|---|---|---|---|
| 2015/0323462 A1* | 11/2015 | Ghosh | G01N 21/6486 |
| | | | 435/29 |
| 2015/0355446 A1* | 12/2015 | Kues | G02B 21/06 |
| | | | 359/389 |
| 2016/0088233 A1* | 3/2016 | Lu | H04N 9/3185 |
| | | | 348/239 |
| 2016/0120397 A1* | 5/2016 | Namii | A61B 1/00193 |
| | | | 348/68 |
| 2017/0322405 A1* | 11/2017 | Matsubara | G02B 21/14 |
| 2018/0080863 A1* | 3/2018 | Chiu | C12Q 1/68 |
| 2018/0267286 A1* | 9/2018 | Bonzon | C12M 23/12 |

* cited by examiner

Fig. 1

(Prior Art)

Fig. 2

(Prior Art)

Fig. 3

(Prior Art)

TRANS-ILLUMINATION IMAGING WITH AN ARRAY OF LIGHT SOURCES

INTRODUCTION

A layer of biological cells supported on a planar substrate can be visualized with an imaging microscope. The microscope may be designed to perform trans-illumination imaging in which light is transmitted through the cells to an imaging detector. The cells can be stained before they are imaged or left unstained.

Cell-based assays are often performed in the wells of a multi-well sample holder, in a high-throughput format. Each well generally has a flat floor to which a set of cells is attached. The sample holder thus provides an array of spatially-isolated compartments capable of holding a corresponding array of sets of cells. The sets may be treated differently, such as exposed to different compounds, to test the effect of each treatment on at least one of the sets. For example, the sets of cells may be used to screen members of a library of compounds for a desired biological activity.

Trans-illumination imaging at low magnification can capture a respective image of each cell set, optionally in its entirety, before, during, and/or after a cell-based assay is performed. This imaging may, for example, read a result of the assay, and/or may check or monitor cell number, density, health, phenotype, etc. In some assays, it is important to know how many cells are present in a well. For example, when generating new cell lines, such as hybridomas, imaging can be used to verify that only one cell was present initially in a given well. Otherwise, the clonal purity of any cell line originating from the well is uncertain. However, the visibility of cells within an image may vary according to their position on the floor of the well. Improved approaches to trans-illumination imaging of cells at low magnification are needed.

SUMMARY

The present disclosure provides a method and system for trans-illumination imaging. In an exemplary method, a sample is irradiated in a well. The sample may include biological cells and a liquid or semi-solid medium that forms a meniscus. The step of irradiating may be performed with an array of light sources generating light of respective light beams that are incident on the meniscus at different orientations from one another. One or more images may be detected. A proportional contribution of light from two or more subsets of the light sources to the one or more images may be controlled by differential energization of the two or more subsets relative to one another to compensate for refraction by the meniscus and improve contrast.

DETAILED DESCRIPTION

The present disclosure provides a method and system for trans-illumination imaging. In an exemplary method, a sample is irradiated in a well. The sample may include biological cells and a liquid or semi-solid medium that forms a meniscus. The step of irradiating may be performed with an array of light sources generating light of respective light beams that are incident on the meniscus at different orientations from one another. One or more images may be detected. A proportional contribution of light from two or more subsets of the light sources to the one or more images may be controlled by differential energization of the two or more subsets relative to one another to compensate for refraction by the meniscus and improve contrast.

The methods and systems of the present disclosure offer various advantages over the prior art. The advantages may include higher and more uniform contrast across the floor of a well in low magnification (and/or low numerical aperture (NA)) images. Also or alternatively, the advantages may include consistent image quality with different sample and well configurations, through use of different energization procedures. In some embodiments, a user may input values for one or more sample parameters to allow the imaging system to select a suitable energization procedure for the sample.

Further aspects of the present disclosure are described in the following sections: (I) optical effects of a liquid or semi-solid meniscus on trans-illumination imaging, (II) trans-illumination imaging with meniscus compensation, (III) exemplary system configurations for meniscus compensation, (IV) methods of imaging with an array of light sources, and (V) selected embodiments.

I. Optical Effects of a Liquid or Semi-Solid Meniscus on Trans-Illumination Imaging This section explains the detrimental effects of a liquid or semi-solid meniscus on the quality of images detected by a trans-illumination imaging system 50 of the prior art; see FIGS. 1-3.

Imaging system 50 can be utilized to detect trans-illumination images of a sample 52 contained by a well 54. The sample may include a layer of biological cells 56 arranged on a floor 58 of the well in a specimen plane 60 of the imaging system (see FIGS. 1 and 3). One or more side walls 62 may extend upward from a perimeter 64 of floor 58 to completely surround the central axis 66 of the well. Floor 58 has a central region 67a that includes central axis 66, and an edge region 67b surrounding the central region and located adjacent side walls 62 The floor and side walls collectively create a volume for holding biological cells 56 and a liquid or semi-solid medium 68 of sample 52 in which the cells are immersed. The medium is present in FIG. 2, but absent from FIG. 1, to illustrate the optical effect of a meniscus 70 formed by medium 68. A semi-solid medium may include an aqueous gel. Accordingly, the medium may include a gelling agent (e.g., agar, agarose, guar gum, or the like).

Figure 1:
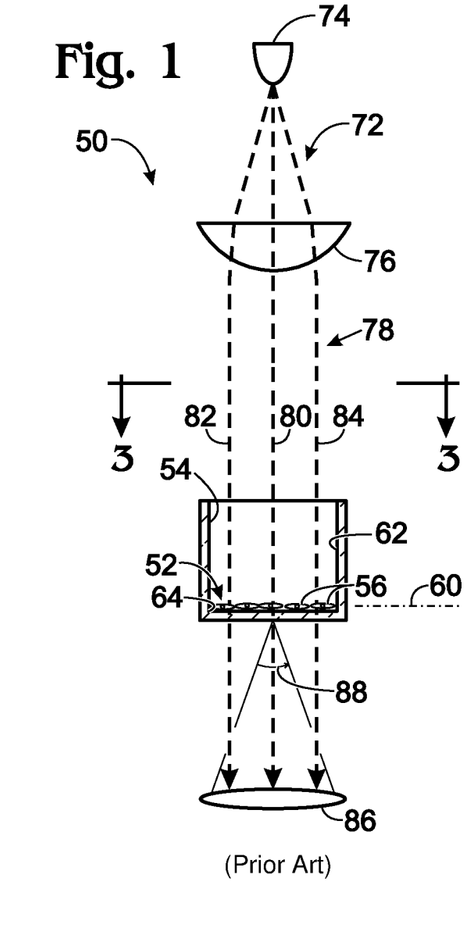
FIG. 1 is a schematic, partially sectional view of selected aspects of a prior art trans-illumination imaging system irradiating a sample with light generated by only a single light source, with the sample including biological cells and contained by a well that is otherwise empty, and with a central light ray and two lateral light rays illustrated.

Sample 52 is irradiated with light 72 generated by a single light source 74. The light may be directed from the light source to the sample with at least one optical element 76 that forms a beam 78 of the light, which may or may not be collimated by the at least one optical element. A central ray 80 and a pair of lateral rays 82, 84 of beam 78 are shown. The central ray follows the optical axis of the system, while lateral rays 82, 84 are offset laterally from the optical axis.

Light 72 is transmitted through sample 52 and collected by an objective 86 located downstream of the sample. The objective focuses the collected light onto an imaging detector (not shown), which detects an image of the sample (and particularly the cells thereof) formed with the collected light.

Figure 2:
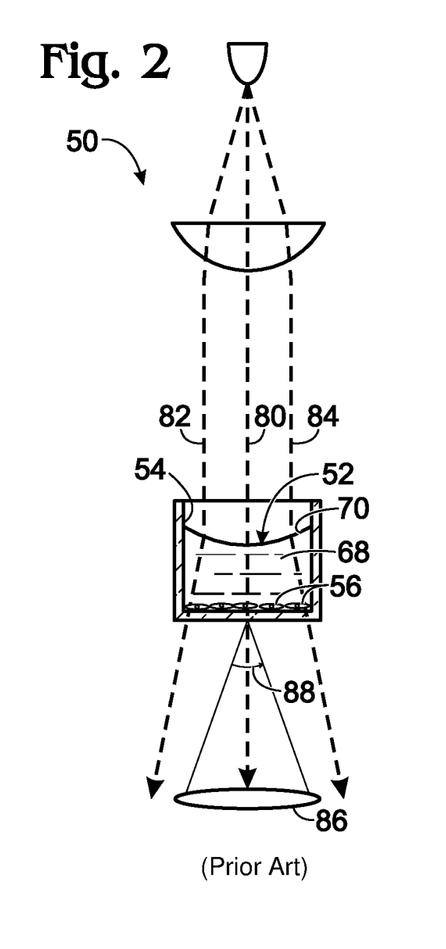
FIG. 2 is another view of the prior art trans-illumination imaging system of FIG. 1, taken as in FIG. 1, except with addition of a liquid or semi-solid medium to the well to create a meniscus above the cells that disproportionately reduces collection of the two light lateral rays by an objective below the well.
Figure 3:
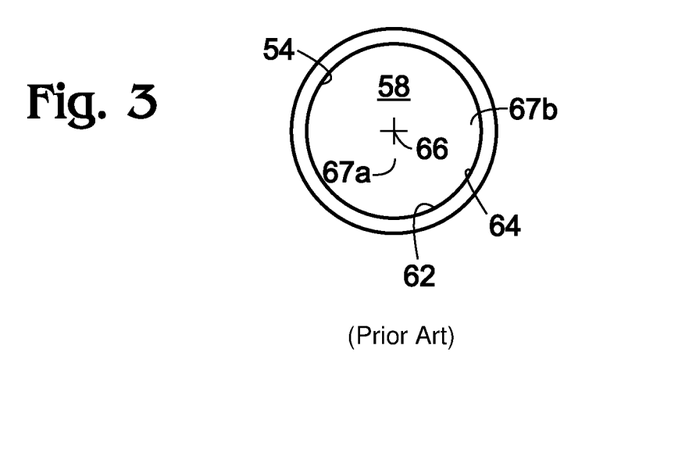
FIG. 3 is a plan view of the well of FIG. 1, taken generally along line 3-3 of FIG. 1, but in the absence of the cells.

Objective 86 may have a small numerical aperture (i.e., a small acceptance angle 88), to produce a relatively low magnification image representing at least a majority of the area of floor 58. However, the presence of medium 68, and particularly meniscus 70, can disproportionately affect collection of lateral rays 82, 84 relative to central ray 80.

FIGS. 1 and 2 compare how the respective absence and presence of medium 68 affect light rays 80, 82, and 84. Without a meniscus, the light rays are not refracted in FIG. 1 and travel on respective linear paths through sample 52 and the bottom of well 54 to objective 86. (Any refraction by biological cells 56 is ignored for this discussion.) In contrast, meniscus 70 selectively affects lateral rays 82, 84 in FIG. 2. Central ray 80 is incident on the meniscus on a path that is normal to the meniscus, and thus is not refracted. Lateral rays 82, 84 are incident on meniscus 70 at positions closer to the side wall of the well, where the meniscus is not horizontal, which causes the lateral rays to be refracted away from the central ray as each ray passes from air to liquid. As a result, the lateral rays are no longer within acceptance angle 88 of objective 86. Therefore, the image detected will be brighter at central region 67a and darker at edge region 67b of the floor (see FIG. 3). Also, the contrast will not be uniform, but instead will be better centrally or laterally based on the duration of image detection. An improved trans-illumination imaging system is needed that produces images with more uniform contrast.

Sample 52 may have any suitable properties. The sample may be organic and/or inorganic and may include any suitable assembly, material, substance, isolate, extract, particles, or the like. In exemplary embodiments, the sample includes biological cells to be imaged. The biological cells may be eukaryotic or prokaryotic, and may be alive or dead (e.g., fixed). Exemplary biological cells include established cells (cell lines), primary cells, cells of a tissue sample, cells from a clinical sample (e.g., a blood sample, a fluid aspirate, a tissue section, etc.), bacterial cells, or the like. The sample also may include any suitable medium, generally an aqueous medium, which may include water, salts, buffer, glucose, detergent, dye, protein, amino acids, or any combination thereof, among others. The medium may or may not be a growth medium for biological cells.

The sample may be held by a sample holder, which is any device for holding at least one sample or any array of spatially isolated samples. The sample holder may include at least one well. The well may have any suitable total capacity for fluid, such as less than about 10, 5, 2, 1, 0.5, 0.2, or 0.1 mL, and/or greater than about 0.025, 0.05, 0.1, 0.2, 0.5, or 1 mL, among others. The inside diameter of the well may be constant or may vary (e.g., may decrease) from the top to the floor of the well. If the inside diameter decreases toward the floor, the diameter may decrease smoothly, stepwise, or a combination thereof. In some embodiments, the inside diameter may decrease linearly, or smoothly but non-linearly. The shape of the well, as defined in horizontal cross-section, may be constant or may vary from the top to the floor of the well. This shape, and/or the perimeter of the floor, may be circular, oval, polygonal (e.g., rectangular, such as square), or the like. The well may be formed of any suitable material, although polymer may be preferred. The floor and/or side walls of the well may be coated with another material, such as collagen, laminin, fibronectin, or the like, to promote cell adhesion.

The well may be provided by a sample holder (e.g., a multi-well plate) having an array of wells. The wells of the sample holder may be attached to one another (e.g., formed integrally with one another, such as by injection molding) to form a multi-well sample holder having a horizontal array of wells with substantially coplanar floors. The sample holder may have any suitable number of wells, such as at least or exactly 6, 12, 24, 48, 96, or 384 wells, among others. The wells may be arranged in a rectangular array, such as an 8-by-12 array for a multi-well plate having 96 wells, or a 16-by-24 array for a multi-well plate having 384 wells. As described further below, the imaging system may be configured to automatically collect an image of a sample present in each of a plurality of wells of the sample holder. Furthermore, the imaging system may be configured to automatically collect one or more images that collectively represent the entire area of the floor a well. These images may be collected with a single field of view for the well, if the well is sufficiently small (e.g., a well of a 384-well plate), or with two or more fields of view if the well is larger (e.g., four fields of view for a well of a 96-well plate).

II. Trans-Illumination Imaging with Meniscus Compensation

This section describes how an array of light sources can compensate for the detrimental effects of a liquid or semi-solid meniscus on image quality, see FIGS. 4-7. The use of multiple light sources, which may be controlled independently, allows detection of images with more uniform brightness and contrast.

Figure 4:
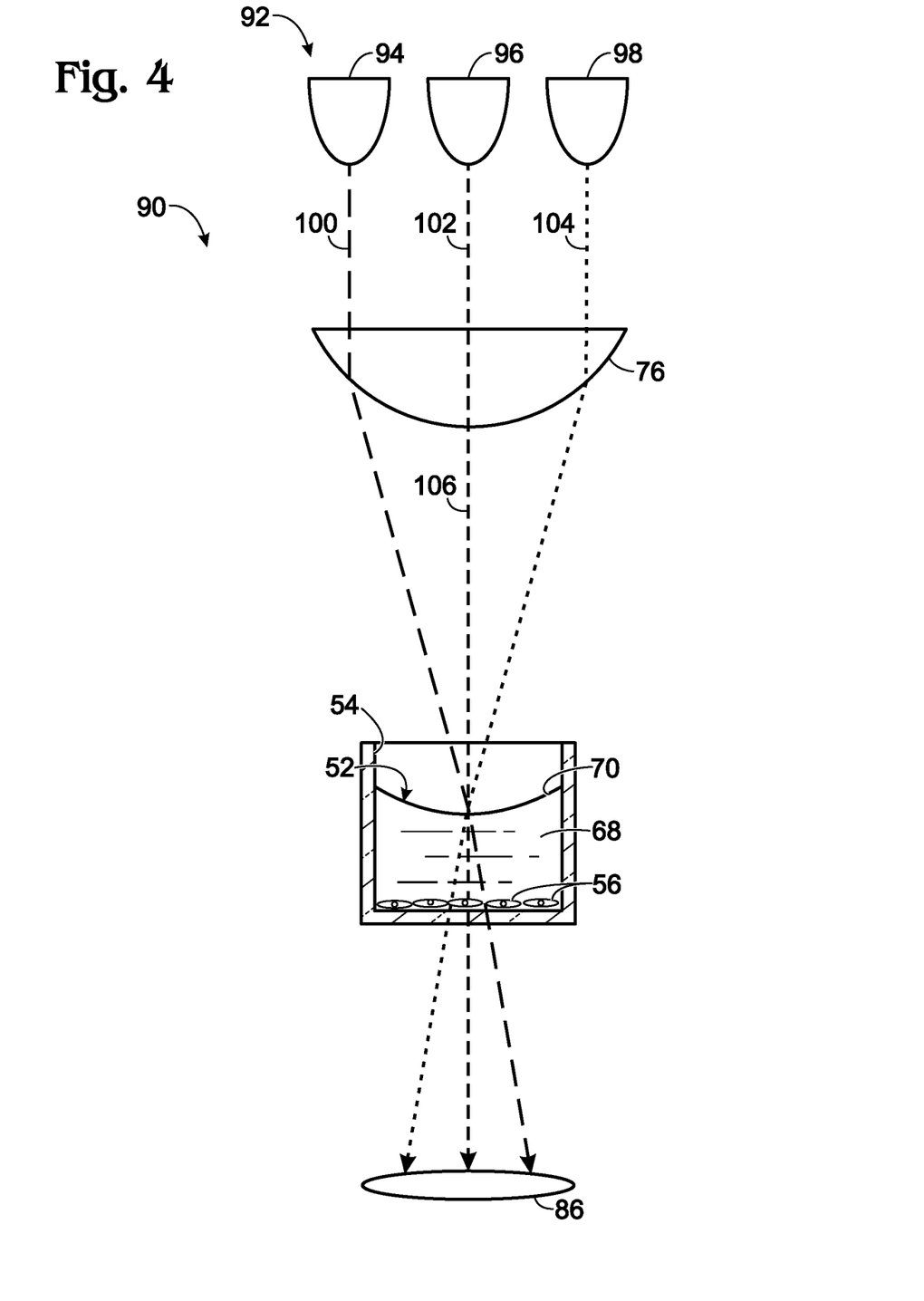
FIG. 4 is a schematic, partially sectional view of selected aspects of a trans-illumination imaging system irradiating the sample of FIG. 2 with light generated by an array of independently energizable light sources, with only a central light ray from each light source illustrated, in accordance with aspects of the present disclosure.

FIG. 4 shows an improved trans-illumination imaging system 90 irradiating sample 52 with light generated by an array 92 of light sources 94, 96, 98. Only a central ray 100, 102, 104 from each of the light sources is represented, with each respective ray having a different length of line dash (long, medium, or short). Central, on-axis light source 96 is located on the optical axis 106 of the imaging system; central ray 102 from the on-axis light source follows optical axis 106, defined by the system optics, to objective 86. Lateral, off-axis light sources 94, 98 are laterally offset from optical axis 106 of the imaging system. As a result, central rays 100, 102, 104 from the three light sources are incident on meniscus 70 at different orientations from one another.

Figure 5:
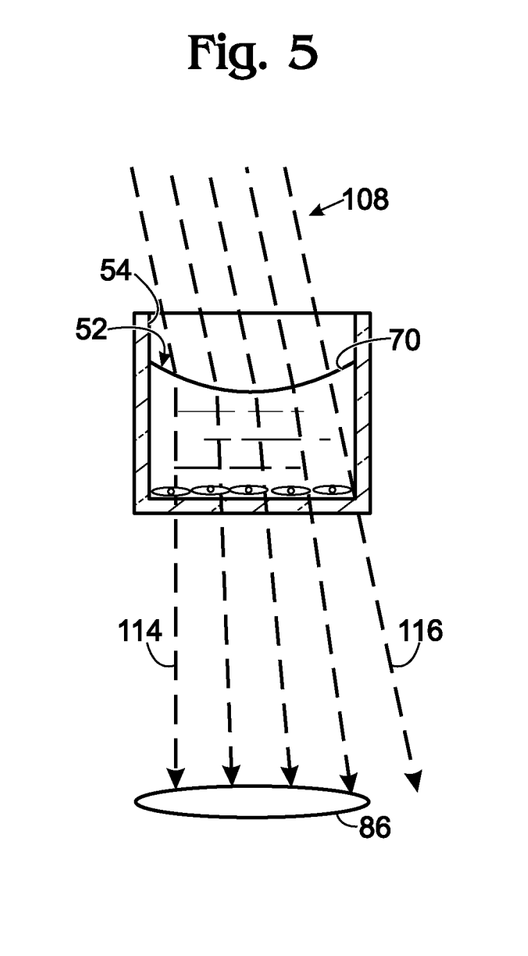
FIGS. 5-7 are schematic, partially sectional views of the trans-illumination imaging system of FIG. 4, illustrating a lateral ray, a central ray, and another lateral ray from the corresponding light sources passing through the sample to the objective, in accordance with aspects of the present disclosure.
Figure 6:
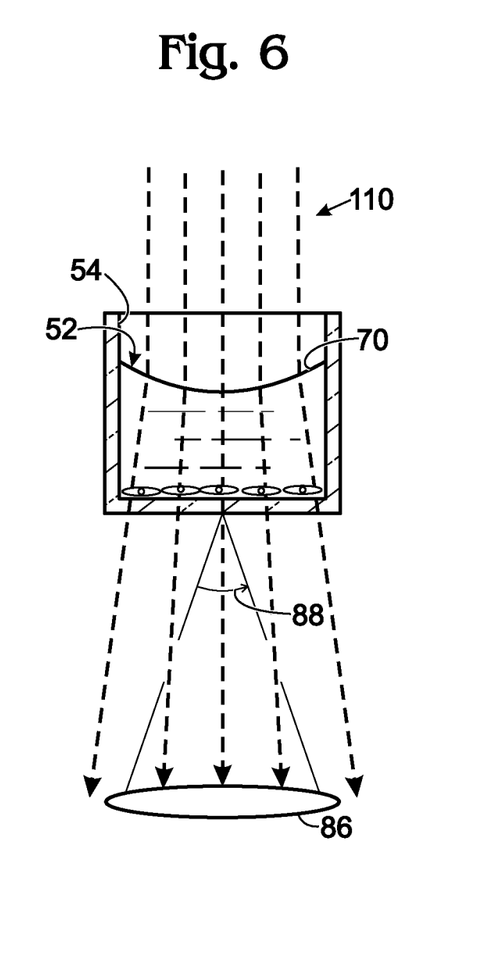
Figure 7:
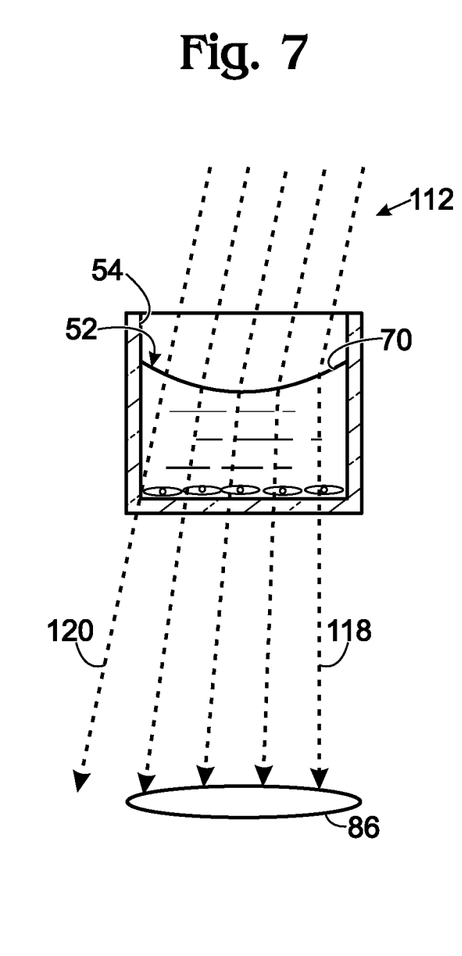

The benefit of these different orientations of radiation is illustrated in FIGS. 5-7, for each of the light sources individually. Each figure shows five rays from a respective beam 108, 110, 112 formed with light generated by only one of light sources 94, 96, 98. Each set of five rays includes one of central rays 100, 102, 104 and four lateral rays offset from the corresponding central ray. Within each set, the rays may be parallel to one another until they are differentially refracted by meniscus 70. The rays of FIG. 6 correspond to those of FIG. 2, except with the addition of two intermediate rays. FIG. 6 is shown here for comparison with FIGS. 5 and 7, and will not be discussed further.

FIG. 5 shows an oblique beam 108 produced with light from light source 94. A lateral ray 114 near the left edge of beam 108 is refracted to a normal orientation and passes through sample 52 orthogonal to the specimen plane and reaches objective 86. However, a corresponding lateral ray 116 near the right edge of the beam misses the objective. Therefore, beam 108 skews the brightness of the well's floor (and overlying cells) toward one side of the floor (i.e., the left side of the floor in FIG. 5).

FIG. 7 shows an oblique beam 112 produced with light from light source 98. Beam 112 produces an effect similar to beam 108 but in the opposite direction. A lateral ray 118 near the right edge of beam 112 is refracted to a normal orientation and passes through sample 52 orthogonal to the specimen plane and reaches objective 86. However, a corresponding lateral ray 120 near the left edge of the beam misses the objective. Therefore, beam 112 skews the brightness of the well's floor (and overlying cells) toward the opposite side of the floor relative to beam 108 in FIG. 5. The proportional contribution of light from each of the light sources, to the detected image of the sample, may be selected and controlled to better equalize the detected light intensity from central and lateral regions of the well's floor (and overlying cells).

III. Exemplary System Configurations for Meniscus Compensation

Figure 8:
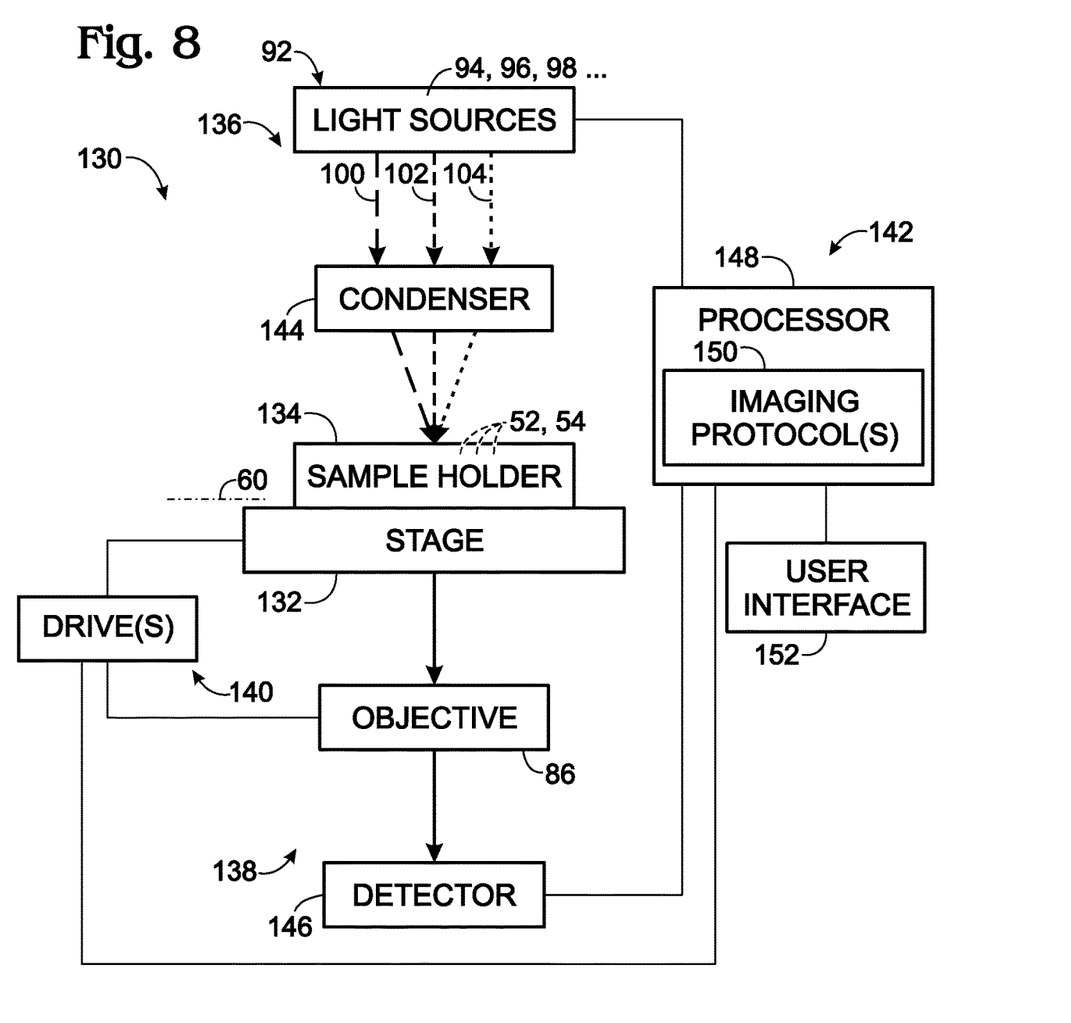
FIG. 8 is a schematic view of an exemplary trans-illumination imaging system having an array of independently energizable light sources, in accordance with aspects of the present disclosure.
Figure 9:
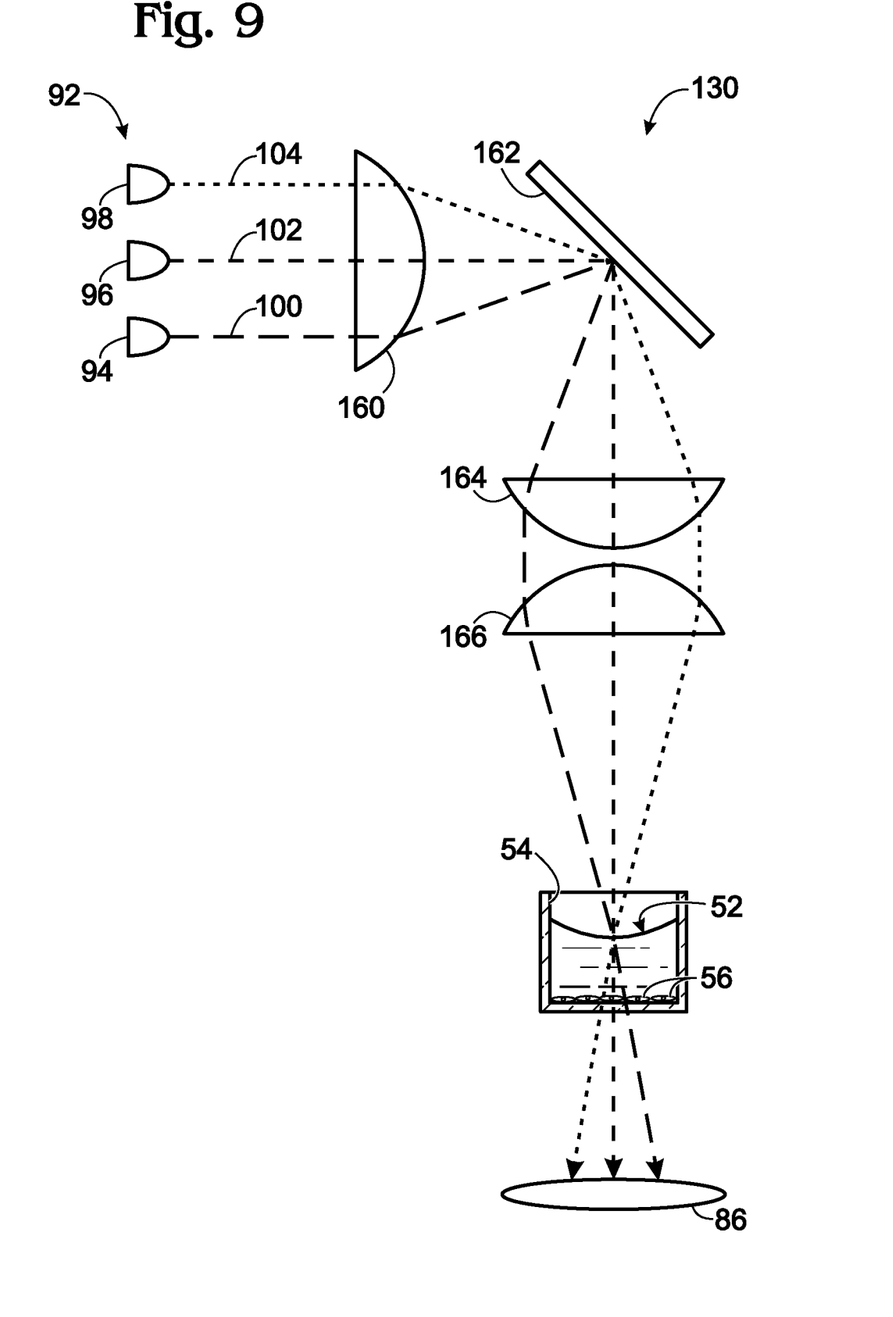
FIG. 9 is a schematic view of an exemplary optical configuration for the imaging system of FIG. 8, in accordance with aspects of the present disclosure.
Figure 10:
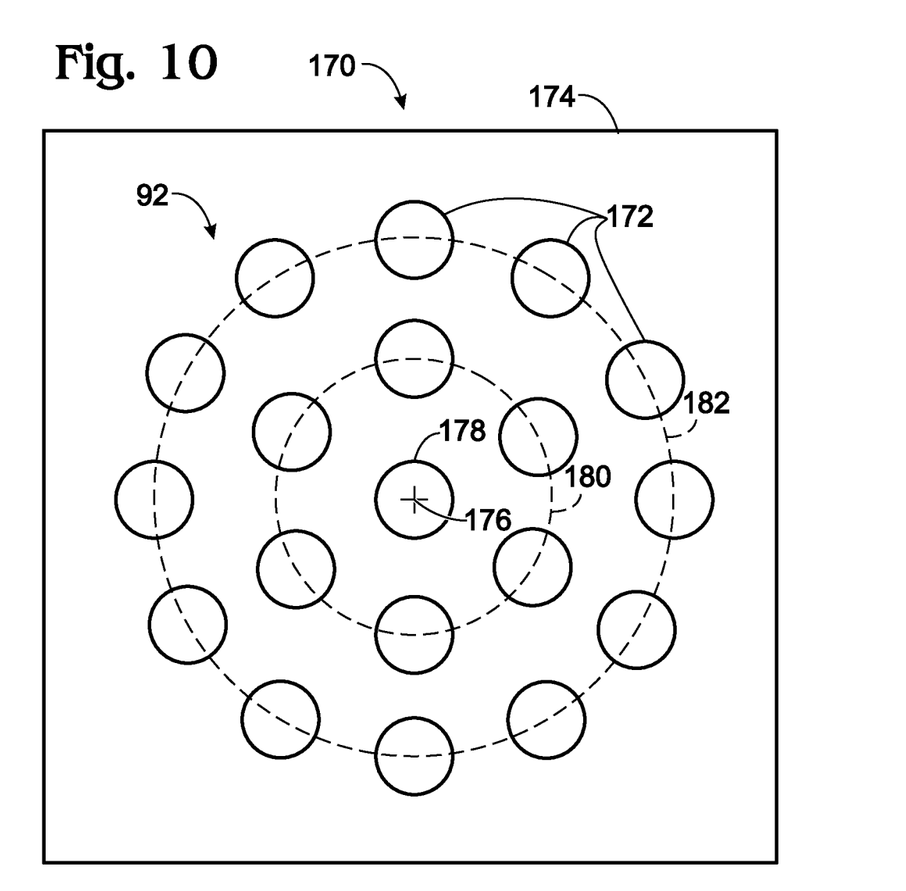
FIG. 10 is a view of an exemplary array of light sources for the imaging system of FIG. 8, taken orthogonal to a plane defined by the array, in accordance with aspects of the present disclosure.

This section describes an exemplary trans-illumination imaging system 130 with an array 92 of light sources to achieve meniscus compensation; see FIGS. 8-10. Imaging system 130 is exemplified in FIGS. 8 and 9 with only three light sources 94, 96, 98 and three rays 100, 102, 104, as in FIG. 4, but may have any suitable number and arrangement of light sources, as exemplified in FIG. 10.

Imaging system 130 may include a stage 132 to support at least one sample holder 134 in a specimen plane 60, which may be horizontal. Sample holder 134 may hold one or more samples 52 contained in one or more wells 54 provided by the sample holder. In some embodiments, the sample holder may spatially isolate a plurality of samples from one another in respective wells. Stage 132 may support the floor of each well 54 in or near specimen plane 60, and may define a window (e.g., an opening) under the well that is transmissive for the wavelength of light used for trans-illumination imaging. Each sample holder, well, and sample may have any suitable combination of features described above in Section I or elsewhere herein.

The imaging system also may include various subsystems (interchangeably termed modules) that cooperate with one another to provide trans-illumination imaging of each sample 52 of sample holder 134. These subsystems may include an irradiation subsystem 136, a detection subsystem 138, a drive subsystem 140, and a control/processing subsystem 142.

Irradiation subsystem 136 may include an array 92 of light sources to generate light, and a condenser 144 to collect the light and direct it to the sample. Three light sources 94, 96, 98 of array 92, and corresponding central rays 100, 102, 104, are identified in FIG. 8 to facilitate comparison with FIG. 4. However, the array may include any suitable number of light sources, such as at least 4, 5, 6, 8, 10, 15, or 20, among others (e.g., see FIG. 10). At least one subset of the light sources of the array (e.g., each of the light sources) may be energizable independently of the other light sources of the array. Energization includes applying an electrical voltage and/or supplying an electric current to the light source sufficient to cause generation of light (i.e., to turn the light source on), and, optionally, selecting or adjusting the level of power supplied (e.g., the amount of electrical voltage/current) to generate a desired intensity of light from the light source. In other words, the on/off state and the intensity of each light source (and/or a subset of the light sources) may be changed independently of the other light sources (and/or at least one other subset of the light sources). The level of power supplied to a given light source interchangeably may be called the energization level for the light source.

Array 92 may have any suitable properties. The light sources therein may be arranged in a one-dimensional, two-dimensional, or three-dimensional array. However, a two-dimensional array may be preferred to simplify construction and reduce the complexity of the condenser. Each of the light sources may be of the same type, may generate light of the same wavelength, and/or may have the same maximum intensity. For example, the light sources may be copies of one another. Each light source may generate light by any suitable mechanism, including electroluminescence, stimulated emission, thermal radiation, and/or photoluminescence, among others. Accordingly, the light source may include a solid-state device, laser, arc lamp, or the like. Exemplary solid-state devices include semiconductor light sources, such as light-emitting diodes (LEDs), superluminescent diodes, and laser diodes, among others.

Condenser 144 may include any suitable number of optical elements disposed in the optical path between the array of light sources and the sample. An optical element may be any device or structure that collects, directs, and/or focuses light and/or at least partially blocks light. An optical element may function by any suitable mechanism, such as reflection, refraction, scattering, diffraction, absorption, and/or filtering, among others. Exemplary optical elements include lenses, mirrors, diffusers, gratings, prisms, filters, apertures, masks, beam-splitters, transmissive fibers (fiber optics), and the like. In some embodiments, the condenser may collimate light from each of the light sources, to provide Köhler illumination of the sample with a collimated beam of light from each light source.

The array of light sources and the condenser may cooperate to irradiate the sample with a plurality of light beams, which may overlap one another at any position along the optical path from the light sources to the sample (and to the imaging detector). Each of the light beams may be produced with light from a different light source of the array and may have a different orientation from the other light beams. The orientation of each light beam at the meniscus (or specimen plane) may be defined by its angular offset (or lack thereof) from a vertical axis (or some other reference axis), and by its rotational position about the optical axis of the condenser. Each light beam, independent of the other light beams, may have any suitable offset from the vertical axis, such as 0 degrees, or less than or greater than about 1, 2, 3, 4, 5, 7, or 10 degrees, among others. The light beams collectively may have at least 1, 2, 3, or 4 different values of angular offset from a vertical axis. The light beams also or alternatively may have at least 3, 4, or 5 different rotational positions about the optical axis (e.g., see FIG. 10).

Irradiation subsystem 136 and detection subsystem 138 may be arranged to irradiate each sample 52 from above specimen plane 60 and to detect light collected below specimen plane 60. In other cases, the imaging system may have an inverted configuration in which the relative positions of subsystems 136, 138 are reversed, such that irradiation occurs from below and light for detection is collected above the specimen plane.

Detection subsystem 138 may include an objective 86 and an imaging detector 146. The objective collects light that has passed through the floor of the well and focuses the light onto a photosensitive area of the imaging detector. To simplify illustration, central rays 100, 102, 104 are shown as being combined downstream of the sample, and are represented collectively below the sample by non-dashed vertical arrows. Objective 86 may include any suitable number of optical elements, such as a set of lenses mounted in a housing. The objective may be a low-magnification objective (e.g., providing no more than about 5×, 10×, or 20× magnification), and may have a numerical aperture of no more than about 0.4, 0.3, or 0.2, among others.

The imaging detector is any device capable of detecting spatial variations (e.g., variations in intensity) of light across a detection area. The imaging detector may be an array detector, such as a charge-coupled device (CCD) sensor, an active pixel sensor (e.g., a complementary metal-oxide-semiconductor (CMOS) sensor, an N-type metal-oxide-semiconductor (NMOS) sensor, etc.), or the like. The imaging detector may detect pixels of an image, such as a rectangular array of pixels, and may be configured to detect color images, grayscale (monochromatic) images, or both.

Drive subsystem 140 may include one or more drive mechanisms to move components of imaging system 130 relative to one another. Each drive mechanism may include a motor (e.g., a servomotor) and a linkage connecting the motor to at least one system component. The drive subsystem may provide movement of the stage and objective relative to one another (e.g., parallel to a vertical axis and/or the optical axis at the specimen plane) to change the distance between the stage and the objective, which may focus an image of the sample at the imaging detector. A drive mechanism of the drive subsystem also or alternatively may move the stage and the optical axis relative to one another in two dimensions in a horizontal plane and/or in a plane orthogonal to the optical axis at the specimen plane, to move the field of view with respect to a sample (e.g., to choose an area of the sample or floor to image and/or to place a different sample (and well) of the sample holder in the field of view).

Control/processing subsystem 142 may be in communication with and/or may control operation of any suitable combination of devices of imaging system 130. Subsystem 142 may include a processor 148, also called a controller, which may be in the form of a computer.

Processor 148 may control energization of light sources 94, 96, 98, namely, the timing/sequence of energization and the level of energization. This energization may be based on an imaging protocol selected from a set of predefined imaging protocols 150 stored in memory of the processor. Each imaging protocol may include an energization procedure that defines the time interval(s) and the level(s) of energization for light sources during one or more irradiation intervals. The imaging protocol also may include a detection procedure specifying the time period(s) during which imaging detector 146 will detect light, relative to the energization of the light sources. Each imaging protocol may be designed for a particular value or range of values for one or more sample parameters, which may be related to the shape and/or position of the meniscus. The imaging protocol may be selected by the processor based on input from the user about the configuration of the sample and/or sample holder, with the input communicated to the processor via a user interface 152 (e.g., a display, keyboard, mouse, touchscreen, or any combination thereof, among others).

Processor 148 may be in communication with imaging detector 146. This communication may allow the processor to control operation of the imaging detector, such as the timing of image detection relative to the energization of light sources based on an energization procedure. The processor also may receive and process image data from imaging detector 146.

Imaging system 130 also has a source of power to drive operation of each of the devices thereof (e.g., each light source, the imaging detector, the processor, drive mechanisms, etc.). The power may, for example, be line power, battery power, or a combination thereof.

FIG. 9 shows an exemplary optical configuration for imaging system 130 that achieves Köhler illumination of sample 52. The optical configuration is illustrated with only three light sources 94, 96, 98, but in other embodiments may transmit light to the sample from any suitable number of light sources. Only central rays 100, 102, 104 from the light sources are depicted. Each ray is refracted by a plano-convex lens 160, reflected by a mirror 162, transmitted through a pair of plano-convex lenses 164, 166, passes through meniscus 70 and cells 56 of sample 52, and is collected by objective 86 for transmission to the imaging detector.

FIG. 10 shows an exemplary source module 170 for imaging system 130. Source module 170 forms an array 92 of light sources 172, which may be, for example, be solid-state light sources, such as light-emitting diodes (LEDs). Light sources 172 are mounted to a support member 174 that holds the sources in a fixed arrangement, which may define a plane. The optical axis 176 of the imaging system may pass centrally through array 92, such as orthogonally to the plane of the array. A central light source 172 of array 92, identified by reference number 178, may be located on optical axis 176, or all of the light sources may be located off-axis (i.e., laterally offset from the optical axis). The light sources may be arranged in any suitable shape, such as a circular/radial array (as shown here), a rectangular array, an irregular array, or the like. The shape of the array may correspond to the shape of the floor of each well. For example, the light sources may be arranged in one or more rings centered on optical axis 176. Each ring may be formed by 3, 4, 5, 6, or more light sources. In the depicted embodiment, off-axis light sources of array 92 are arranged in an inner ring 180 of six light sources 172, and an outer ring 182 of twelve light sources, around central, on-axis light source 178. In some embodiments, each ring of lights may be energized as a unit. A desired uniformity of the brightness and contrast of the detected image of the sample may be achieved by appropriate selection of the number and spacing of light sources within each ring, the number and sizes of the rings, and the proportional contribution of light from each ring to the detected image.

IV. Methods of Imaging with an Array of Light Sources

This section describes an exemplary method 200 of trans-illumination imaging with an array of light sources, and exemplary timelines and configurations for irradiation and image detection; see FIGS. 11-15.

Figure 11:
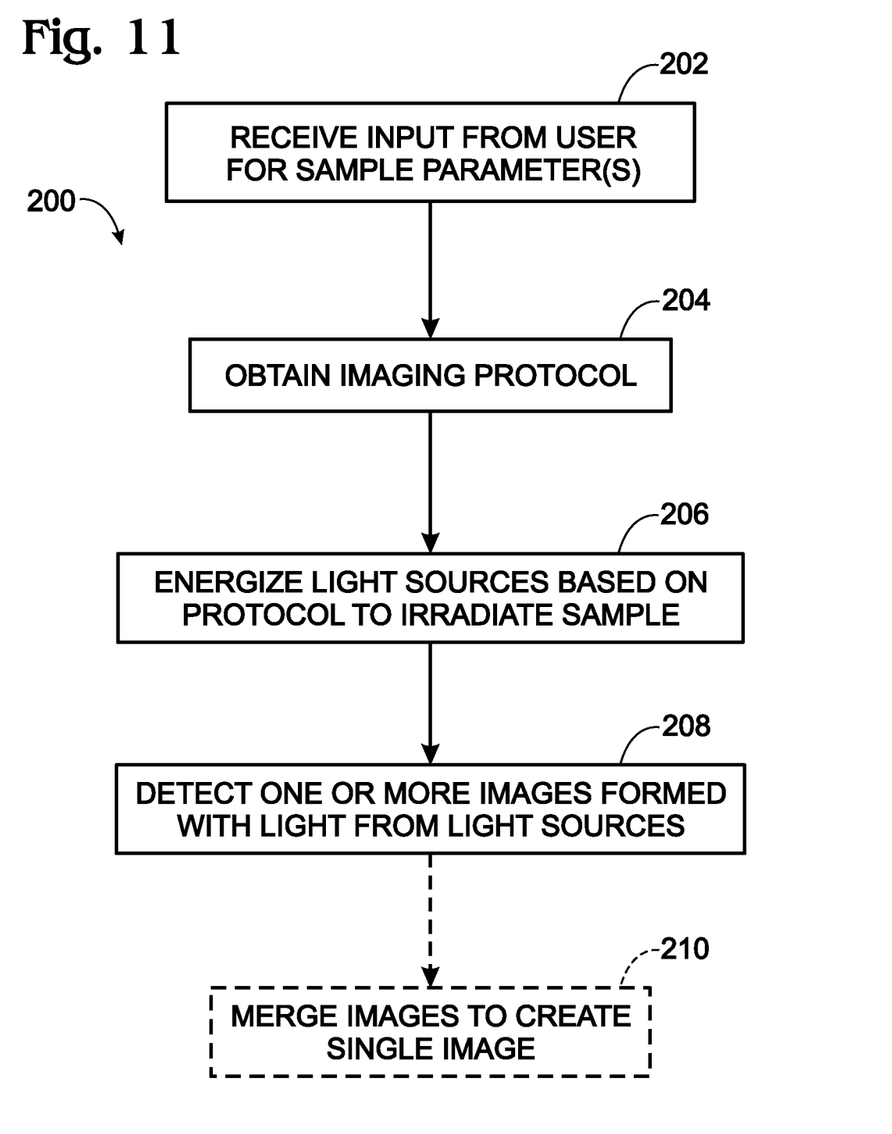
FIG. 11 is a flowchart illustrating an exemplary method of trans-illumination imaging using an array of light sources, in accordance with aspects of the present disclosure.
Figure 12:
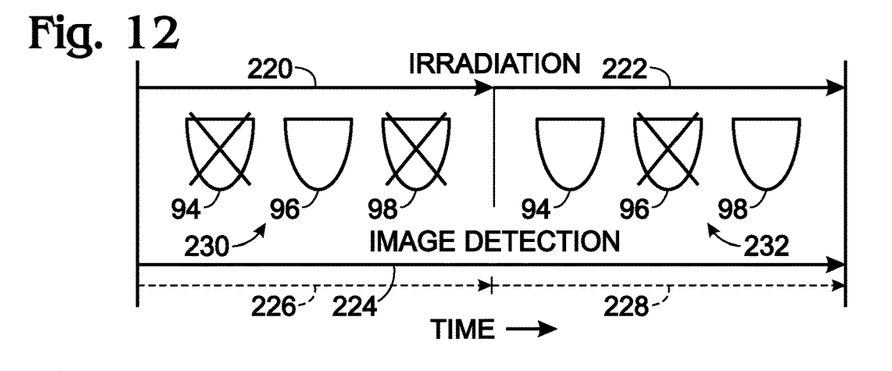
FIGS. 12-15 are timelines schematically illustrating exemplary relationships between the steps of irradiating and detecting in the method of FIG. 11, with the step of irradiating including differential energization of subsets of light sources for detection of a single image, in accordance with aspects of the present disclosure.
Figure 13:
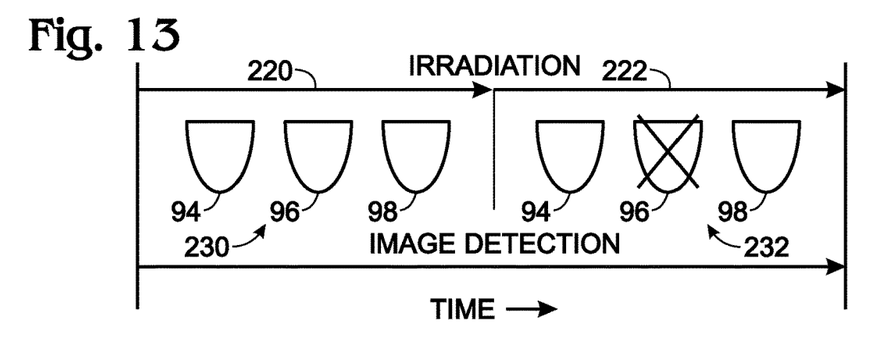
Figure 14:
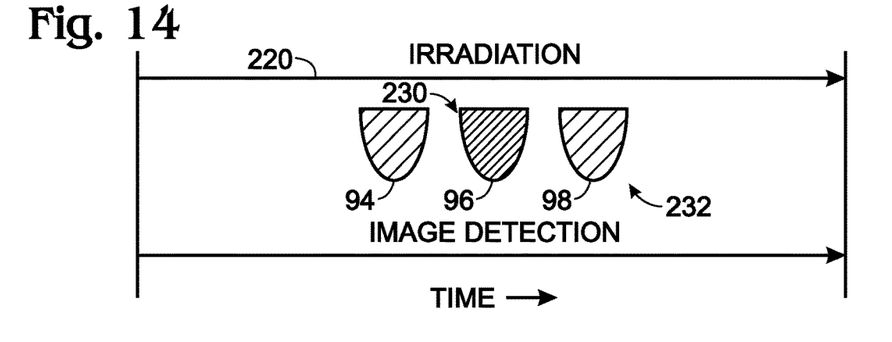
Figure 15:
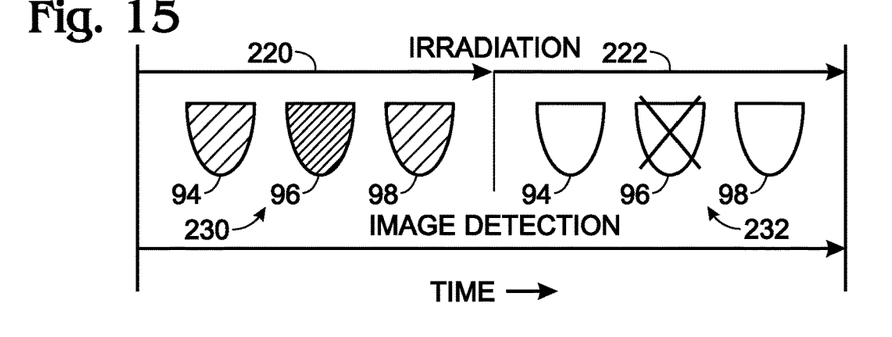

FIG. 11 shows a flowchart listing exemplary steps of method 200. The steps presented in FIG. 11 and/or described elsewhere herein may be performed in any suitable order and combination, using any of the system components and features of the present disclosure.

Input may be received from a user, indicated at 202. The input may specify a respective value for each of one or more sample parameters. The value may be a character(s), text string, number, and/or the like. A sample parameter, as used herein, is any parameter associated with a sample. Each sample parameter may affect the shape/position of the meniscus, the amount of refraction of light produced by the air-liquid interface at the meniscus, the size of the sample/ floor area to be imaged, and/or the like. The parameter may describe the sample itself, such as cell type, approximate cell density (e.g., percent coverage of the well's floor), or the like. The parameter also or alternatively may describe an aspect of the medium in which biological cells of the sample are immersed. The aspect of the medium may relate to the volume, height, composition, temperature, and/or the like of the medium. The parameter also or alternatively may relate to the sample holder and/or well that contains the sample. For example, the parameter may relate to the volume, shape, and/or height of a well; the shape, area, and/or diameter of the well's floor; and/or the surface energy of the well's side walls, as reflected by the composition of the sample holder, the composition of a coating on the side walls, and/or the manufacturer/model of the sample holder; among others. The input may be received via a user interface (e.g., a graphical user interface), as described in Section III.

An imaging protocol may be obtained, indicated at 204. The imaging protocol may be obtained based on input (e.g., one or more values) regarding one or more sample parameters, which was received from the user in step 202. For example, an imaging protocol may be selected from a set of predefined imaging protocols stored in memory of the imaging system's processor. In some embodiments, at least part of the imaging protocol may be formulated dynamically with one or more custom settings, e.g., at least one value of the imaging protocol obtained may be calculated (e.g., by interpolation or extrapolation) based on input from the user.

The imaging protocol may include an energization procedure and a detection procedure. The energization procedure produces irradiation of the sample, indicated at 206, and may define one or more of the following as irradiation proceeds: (a) a respective level(s) of energization of each light source of the array of light sources, (b) a time interval(s) during which each light source is energized, (c) a pulse modulation, if any, to be used for energization of each light source, (d) an order in which subsets of the light sources are energized, if the entire array of light sources is not energized at the same time, and (e) energization pauses, if any, within the energization procedure during which none of the light sources are energized.

A set of energization procedures may be created by calibrating the imaging system with different values of at least one sample parameter. For example, calibration may be performed with imaging tests conducted with different volumes of medium in a well, different compositions of medium of the same volume in the well, different sample holders, and/or the like. In an exemplary calibration with a given sample configuration, each of the light sources (or each subset of two or more subsets of the light sources) may be energized by itself, and a separate image of the sample detected with irradiation by each individual light source (or subset). The resulting images map each light source or subset of light sources into image space and allow a suitable proportional contribution of each light source (or subset of light sources) to be calculated for a particular sample configuration, in order to equalize the detected intensities across the floor of the well. Calibration may be performed by the manufacturer or the user.

The detection procedure of the imaging protocol may define when one or more images are detected, indicated at 208. A step of detecting an image, as used herein, may include a step of detecting light as a two-dimensional array of pixels, and a step of creating signals representing the pixels.

The detection procedure may define, for step 208, one or more periods of light detection by an imaging detector relative to energization of the light sources of the source array. In some embodiments, a single detection period is used, and substantially all of the light of an image of the sample may be detected during the detection period while the same set of light sources (e.g., every light source of the source array) remains energized. Two or more subsets of the light sources may be energized at two or more different levels of energization within the set, as defined by the energization procedure of the imaging protocol. Once the light sources are energized, the respective levels of energization may remain constant during the detection period. In other embodiments, each of two or more different subsets of the light sources of the source array may be turned on and/or off at different times for a single detection period or during two or more detection periods that produce an image. For example, all of the light sources of the source array may be turned on together, and then a more central subset of light sources of the source array may be turned off first, to selectively increase the amount of light detected from the edge of the well's floor relative to its center. As another example, light detection may occur with only a more central subset of light sources energized, and then with only a more peripheral subset of light sources energized, or vice versa (see below).

The detection procedure also may define the number of images of the sample to be detected in step 208 with the same field of view and the same focus, and/or the number of different fields of view of the sample at which image detection will be performed. A single image may be detected for a given field of view. In other words, step 208 may produce an image having uniform contrast of the sample. Alternatively and optionally, as indicated at 210 with dashed lines, two or more images may be detected with the same field of view and then processed to produce a single image. For example, two or more lower-quality images of less uniform contrast may be detected with respective different energization configurations of the source array, and then merged (e.g., stitched together) to create a single higher-quality image of more uniform contrast. For example, a first image produced with irradiation from only a central group of light sources of the source array may have good contrast for a more central region of the well's floor but may be too dark near the floor's perimeter, while a second image may have good contrast for a peripheral region of the floor but may be too dark for a more central region of the well's floor. Merging the two images may produce an improved image of more uniform contrast. In some cases, images detected with different fields of view of the same sample and well may be merged to create a single image.

FIGS. 12-15 show timelines schematically illustrating exemplary relationships between the steps of irradiating and detecting for method 200 of FIG. 11. The step of irradiating is performed with an array of light sources, illustrated schematically with light sources 94, 96, 98. For the purposes of this discussion, light source 96 represents one or more relatively more central light sources of the array, and light sources 94, 98 represent a plurality of relatively more lateral or peripheral light sources of the array. For example, and with reference to FIG. 10, light source 96 may a single central light source 178 disposed on optical axis 176, a group of light sources arranged in an inner ring 180, or a combination thereof. Also, light sources 94, 98 may correspond to the light sources of outer ring 182, or, if light source 96 corresponds to central light source 178, light sources 94, 98 may correspond to inner ring 180 (or both rings).

Each of FIGS. 12-15 shows one or more irradiation intervals 220, 222 during which irradiation is performed, and an overlapping detection period 224 during which an image is detected. The irradiation intervals may be of equal or unequal length. Light sources 94, 96, 98 that are energized (i.e., turned on and generating light) during each irradiation interval are shown as either unhatched or hatched, with an increase in the number/density of hatch lines representing a lower level of energization (and thus lower intensity/radiant flux). For example, light source 96 is less energized and generating less light than light sources 94, 98 during earlier interval 220 of FIG. 15. Also, light sources 94, 98 are producing less light during earlier interval 220 than later interval 222 in FIG. 15. Light sources 94, 96, 98 that are not energized (i.e., turned off and not generating light) during a given irradiation interval are marked with an "X". For example, in FIG. 12, light source 96 is on during earlier interval 220 and off during later interval 222.

Only one image is detected during detection period 224 in each of FIGS. 12-15. However, in other embodiments, a respective image may be detected during each irradiation interval 220, 222, as indicated by a pair of dashed detection periods 226, 228 in FIG. 12.

Subsets 230, 232 of light sources 94, 96, 98 may be differentially energized relative to one another. Each subset may be composed of only one light source or multiple light sources. In FIGS. 12-15, subset 230 is composed of central light source 96, and subset 232 is composed of lateral light sources 94, 98. Differential energization of the subsets may include a temporal difference and/or a difference in energization level. The temporal difference may include turning on and/or turning off the subsets at different times relative to one another. For example, in FIG. 12, subset 230 is turned on before subset 232, and is turned off when subset 232 is turned on. As another example, in FIG. 13, both subsets 230, 232 are turned on at the same time, but are turned off at different times (subset 230 is turned off at the end of interval 220, and subset 232 at the end of interval 222). A difference in energization level may be established when the light sources are turned on and may remain substantially constant during the step of irradiating, such that only a single irradiation interval is used (e.g., see FIG. 14). Alternatively, the level of energization of at least one subset may be adjusted from a lower level to a higher level, or vice versa, during the step of irradiating, without turning the subset off (e.g., subset 232 is energized to a higher level at the beginning of interval 222 in FIG. 15).

V. Selected Embodiments

This section describes selected embodiments of the present disclosure as a series of indexed paragraphs.

Paragraph 1. A method of trans-illumination imaging, the method comprising: (A) irradiating a sample located in a well, the sample including biological cells and a liquid or semi-solid medium that forms a meniscus, the step of irradiating being performed with an array of light sources generating light of respective light beams that are incident on the meniscus at different orientations from one another; and (B) detecting one or more images formed with the light of the respective light beams and representing a field of view including at least part of the perimeter of a floor of the well; wherein a proportional contribution of light from two or more subsets of the light sources to the one or more images is controlled by differential energization of the two or more subsets relative to one another to compensate for refraction by the meniscus and improve contrast.

Paragraph 2. The method of paragraph 1, wherein the step of irradiating includes a step of turning on and/or turning off the two or more subsets of the light sources at different times from one another to at least partially produce the differential energization of the two or more subsets.

Paragraph 3. The method of paragraph 1 or paragraph 2, wherein the step of irradiating includes a step of supplying a different level of power to each subset of the two or more subsets of the light sources to at least partially produce the differential energization of the two or more sub sets.

Paragraph 4. The method of any of paragraphs 1 to 3, wherein the two or more subsets of the light sources include a first subset and a second subset, and wherein the first subset is positioned centrally in the array and the second subset is positioned laterally in the array.

Paragraph 5. The method of any of paragraphs 1 to 4, wherein the array of light sources includes a first light source and a second light source, wherein the floor has an edge region and a central region, and wherein the step of detecting includes a step of detecting more light from the first light source that has passed through the edge region than the central region, and more light from the second light source that has passed through the central region than the edge region, per unit area of the edge region and the central region.

Paragraph 6. The method of any of paragraphs 1 to 5, wherein, during detection of an image of the one or more images, a first light beam of the respective light beams irradiates a central region of the floor more strongly than a lateral region of the floor, and a second light beam of the respective light beams irradiates the lateral region of the floor more strongly than the central region.

Paragraph 7. The method of any of paragraphs 1 to 6, wherein the respective light beams include a first light beam and a second light beam, and wherein the first light beam is incident on the meniscus at a more vertical orientation than the second light beam.

Paragraph 8. The method of any of paragraphs 1 to 7, further comprising a step of collecting light with an objective located in an optical path between the sample and an imaging detector, wherein at least one light beam of the respective light beams is oriented such that a greater amount of light from the at least one light beam is collected during the step of collecting due to the presence of the meniscus, than would be collected if the meniscus were absent, everything else being equal.

Paragraph 9. The method of paragraph 8, wherein the at least one light beam is oriented such that a majority of the at least one light beam misses the objective if the meniscus is removed, everything else being equal.

Paragraph 10. The method of any of paragraphs 1 to 9, further comprising a step of collecting light with an objective located in an optical path between the sample and an imaging detector, wherein the objective defines an acceptance angle for collecting light, and wherein at least one light beam of the respective light beams is incident on the meniscus at an angular offset with respect to vertical of greater than one-half the acceptance angle.

Paragraph 11. The method of any of paragraphs 1 to 10, further comprising a step of collecting light with an objective located in an optical path between the sample and an imaging detector, wherein the step of collecting light is performed with an objective having a numerical aperture of no more than about 0.3.

Paragraph 12. The method of any of paragraphs 1 to 11, wherein the field of view includes the entire perimeter of the floor.

Paragraph 13. The method of any of paragraphs 1 to 12, wherein only one image is detected during the step of detecting, wherein the array of light sources includes a first light source and a second light source, wherein the step of irradiating includes a step of supplying a first level of power to the first light source and a second level of power to the second light source, wherein the first level of power and the second level of power are different from one another, and wherein, optionally, the first level of power is characterized by a first electric current, the second level of power is characterized by a second electric current, and the first and second electric currents are different from one another.

Paragraph 14. The method of paragraph 13, wherein a radiant flux from each light source of the array of light sources is substantially constant while the only one image is detected.

Paragraph 15. The method of any of paragraphs 1 to 14, wherein only one image is detected during the step of detecting, and wherein energization of at least one subset of the two or more subsets of the light sources is changed at an intermediate time point relative to a beginning and an end of the step of detecting.

Paragraph 16. The method of paragraph 15, wherein only a first subset of the two or more light sources is generating light during a portion of the step of detecting, and wherein only a second subset or all of the light sources are generating light during another portion of the step of detecting.

Paragraph 17. The method of any of paragraphs 1 to 16, wherein the step of detecting includes a step of detecting two or more images, further comprising a step of processing the two or more images to create a single image from the two or more images.

Paragraph 18. The method of paragraph 17, wherein the single image has better contrast than each of the two or more images individually.

Paragraph 19. The method of paragraph 17, wherein energization of the light sources is different for detection of each of the two or more images.

Paragraph 20. The method of any of paragraphs 1 to 19, further comprising a step of receiving an input from a user for a sample parameter, wherein the step of irradiating includes a step of energizing the two or more subsets of the light sources differentially based on the input.

Paragraph 21. The method of paragraph 20, wherein the sample parameter is related to the medium that forms the meniscus.

Paragraph 22. The method of paragraph 21, wherein the sample parameter relates to a volume, height, and/or composition of the medium.

Paragraph 23. The method of any of paragraphs 20 to 22, further comprising a step of selecting an energization procedure for the step of irradiating from a set of predefined energization procedures each corresponding to a different configuration of the sample and/or well, wherein the step of selecting is performed with a processor.

Paragraph 24. A system for trans-illumination imaging, comprising: (A) a multi-well sample holder including a plurality of wells, one of the wells of the plurality of wells having a floor and containing a sample including biological cells and a liquid or semi-sold medium that forms a meniscus; (B) a stage supporting the sample holder; (C) an irradiation subsystem including an array of light sources, at least one of the light sources being offset laterally from an optical axis of the system, the light sources being configured to generate light of respective light beams that are incident on the meniscus at different orientations from one another; (D) an objective to collect light; (E) an imaging detector configured to detect one or more images formed with the collected light and representing a same field of view including at least part of the perimeter of the floor; and (F) a processor configured to control a proportional contribution of light from two or more subsets of the light sources to the one or more images by differential energization of the two or more subsets relative to one another to compensate for refraction by the meniscus and improve contrast.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure. Further, ordinal indicators, such as first, second, or third, for identified elements are used to distinguish between the elements, and do not indicate a particular position or order of such elements, unless otherwise specifically stated.

I claim:

1. A method of trans-illumination imaging, the method comprising:

irradiating a sample located in a well, the sample including biological cells and a liquid or semi-solid medium that forms a meniscus, the step of irradiating being performed with an array of light sources generating light of respective light beams that are incident on the meniscus at different orientations from one another, according to an energization procedure, wherein the energization procedure includes differential activation of two or more subsets of light sources of the array of light sources or supplying different levels of non-zero power to each subset of the two or more subsets of the light sources of the array of light sources, wherein the energization procedure including a) the differential activation of the two or more subsets of light sources of the array or b) the supplying different levels of the non-zero power to each subset of the two or more subsets of the light sources of the array compensates for light loss from the trans-illumination imaging due to refraction by the meniscus; and detecting two or more images formed, during the energization procedure, with the light of the respective light beams and representing at least one field of view including at least part of a perimeter of a floor of the well;

analyzing the two or more images for brightness across each image of the two or more images;

merging the two or more images together to produce an improved image of the entire floor of the well, the improved image due to compensation for the light loss caused by the refraction by the meniscus having uniform brightness across the entire floor of the well by merging different portions of each of the two or more images together, wherein the different portions of each of the two or more images has a same or similar brightness.

2. The method of claim 1, wherein the step of irradiating includes a step of turning on and/or turning off the two or more subsets of the light sources at different times from one another to at least partially produce the differential activation of the two or more subsets.

3. The method of claim 1, wherein the step of irradiating includes a step of supplying a different level of non-zero power to each subset of the two or more subsets of the light sources and modifying over time the level of non-zero power to each subset of the two or more subsets of the light sources.

4. The method of claim 1, wherein the two or more subsets of the light sources include a first subset and a second subset, and wherein the first subset is positioned centrally in the array and the second subset is positioned laterally in the array.

5. The method of claim 1, wherein the array of light sources includes a first light source and a second light source, wherein the floor has an edge region and a central region, and wherein the step of detecting includes a step of detecting more light from the first light source that has passed through the edge region than the central region, and more light from the second light source that has passed through the central region than the edge region, per unit area of the edge region and the central region.

6. The method of claim 1, wherein the step of detecting two or more images is performed for each of two or more different fields of view of the same well, further comprising a step of merging images corresponding to the different fields of view to create a single image representing the entire floor of the well.

7. The method of claim 1, wherein the respective light beams include a first light beam and a second light beam, and wherein the first light beam is incident on the meniscus at a more vertical orientation than the second light beam.

8. The method of claim 1, further comprising a step of collecting light with an objective located in an optical path between the sample and an imaging detector, wherein the objective defines an acceptance angle for collecting light, and wherein at least one light beam of the respective light beams is incident on the meniscus at an angular offset with respect to vertical of greater than one-half the acceptance angle.

9. The method of claim 1, further comprising a step of collecting light with an objective located in an optical path between the sample and an imaging detector, wherein the step of collecting light is performed with an objective having a numerical aperture of no more than about 0.3.

10. The method of claim 1, wherein the at least one field of view includes the entire perimeter of the floor.

11. The method of claim 1, wherein the array of light sources includes a first light source and a second light source, wherein the step of irradiating includes a step of supplying a first electric current to the first light source and a second electric current to the second light source, and wherein the first electric current and the second electric current are different from one another.

12. The method of claim 1, wherein energization of at least one subset of the two or more subsets of the light sources is changed at an intermediate time point relative to a beginning and an end of the step of detecting.

13. The method of claim 12, wherein only a first subset of the two or more light sources is generating light during a portion of the step of detecting, and wherein only a second subset or all of the light sources are generating light during another portion of the step of detecting.

14. The method of claim 1, further comprising a step of processing the two or more images to create a single image from the two or more images.

15. The method of claim 14, wherein energization of the light sources is different for detection of each of the two or more images.

16. The method of claim 1, further comprising a step of receiving an input from a user for a sample parameter, wherein the step of irradiating includes a step of energizing the two or more subsets of the light sources differentially based on the input.

17. The method of claim 16, wherein the sample parameter is related to the medium that forms the meniscus.

18. The method of claim 17, wherein the sample parameter relates to at least one of a volume, height, and composition of the medium.

19. The method of claim 16, further comprising a step of selecting an energization procedure for the step of irradiating from a set of predefined energization procedures each corresponding to a different configuration of the sample and/or well, wherein the step of selecting is performed with a processor.

20. A system for trans-illumination imaging, comprising:
a multi-well sample holder including a plurality of wells, one of the wells of the plurality of wells having a floor and containing a sample including biological cells and a liquid or semi-solid medium that forms a meniscus;
a stage supporting the sample holder;

an irradiation subsystem including an array of light sources, at least one of the light sources being offset laterally from an optical axis of the system, the light sources being configured to generate light of respective light beams that are incident on the meniscus at different orientations from one another;

an objective to collect light;

an imaging detector configured to detect two or more images formed with the collected light and representing at least one field of view including at least part of a perimeter of the floor; and a processor configured to control a proportional contribution of light from two or more subsets of the light sources to the one or more images according to an energization procedure;

wherein the energization procedure includes differential activation of two or more subsets of light sources of the array of light sources or supplying different levels of non-zero power to each subset of the two or more subsets of the light sources of the array of light sources in order to detect the two or more images, wherein the energization procedure including a) the differential activation of the two or more subsets of light sources of the array or b) the supplying different levels of the non-zero power to each subset of the two or more subsets of the light sources of the array compensates for light loss from the trans-illumination imaging due to refraction by the meniscus, analyzing the two or more images for brightness across each image of the two or more images, and merging the two or more images together to produce an improved image of the entire floor of the well, the improved image due to compensation for the light loss caused by the refraction by the meniscus having uniform brightness across the entire floor of the well by merging different portions of each of the two or more images together, wherein the different portions of each of the two or more images has a same or similar brightness.

21. A method of trans-illumination imaging, the method comprising:

irradiating, with an array of light sources, a sample located in a well, the sample including at least one biological cell and a liquid or semi-solid medium that forms a meniscus, wherein respective light sources of the array of light sources are configured to be differentially energized based at least in part on an energization procedure, the energization procedure defining one or more energization parameters of the respective light sources of the array of light sources, such as activation of the respective light sources or non-zero power supplied to the respective light source, wherein the energization procedure including the defining one or more energization parameters of the respective light sources of the array of light sources compensates for light loss from the trans-illumination imaging due to refraction by the meniscus;

detecting, based at least in part on a detection procedure, two or more images formed with the light of respective light beams of the respective light sources of the array of light sources, the two or more images representing at least one field of view corresponding to at least part of the sample, wherein the detection procedure defines detection parameters corresponding to the one or more energization parameters; and processing the detected two or more images to generate a single image of the well which is an improved image of the entire floor of the well that compensates for refraction caused by the meniscus by merging different portions of each of the two or more images together, the different portions of each of the two or more images due to compensation for the light loss caused by the refraction by the meniscus having a same or similar brightness, in order to produce the improved image having uniform brightness across the entire floor of the well.

\* \* \* \* \*